United States Patent [19]
Fréchet et al.

[11] Patent Number: 5,139,696
[45] Date of Patent: Aug. 18, 1992

[54] HYDROGEN-BONDED LIQUID CRYSTAL COMPLEXES

[75] Inventors: Jean M. J. Fréchet, Ithaca, N.Y.; Takashi Kato, Tokyo, Japan

[73] Assignee: Cornell Research Foundation, Inc., Ithaca, N.Y.

[21] Appl. No.: 693,331

[22] Filed: Apr. 29, 1991

Related U.S. Application Data

[62] Division of Ser. No. 354,477, May 19, 1989, Pat. No. 5,037,574.

[51] Int. Cl.⁵ .................. C09K 19/52; C09K 19/06
[52] U.S. Cl. .......................... 252/299.01; 252/299.6
[58] Field of Search ........................ 252/299.01, 299.6

[56] References Cited

U.S. PATENT DOCUMENTS

| | | | |
|---|---|---|---|
| 4,873,018 | 10/1989 | Nohira et al. | 252/299.01 |
| 4,880,560 | 11/1989 | Yoshinaga et al. | 252/299.01 |
| 4,915,867 | 4/1990 | Morita et al. | 252/299.01 |
| 4,917,817 | 4/1990 | Nohira et al. | 252/299.01 |
| 4,988,460 | 1/1991 | Morita et al. | 252/299.01 |
| 4,999,122 | 3/1991 | Lockwood et al. | 252/299.01 |

*Primary Examiner*—Robert L. Stoll
*Assistant Examiner*—C. Harris
*Attorney, Agent, or Firm*—Bruce F. Jacobs

[57] ABSTRACT

Novel thermotropic liquid crystal complexes are produced by hydrogen bonding, essentially along the long axes, of two different thermotropic mesogenic compounds. The resultant new mesogenic complexes so produced exhibit mesogenic behavior not only over an expanded temperature range than both of the parent compounds, but also at a higher temperature than for either compound individually. This invention is applicable to both nematic and smectic mesogens.

5 Claims, 4 Drawing Sheets

HYDROGEN-BONDED LIQUID CRYSTAL COMPLEXES

This is a divisional of copending application Ser. No. 07/354,477 filed on May 19, 1989, now U.S. Pat. No. 5,037,547.

FIELD OF THE INVENTION

This invention relates to thermotropic liquid crystal compounds, i.e. mesogens and compounds. More particularly, it relates to novel nematic and smectic mesogens which are produced by the hydrogen bonding of two different mesogens essentially along the long axes of the mesogenic portions of each. As a result of the hydrogen bonding between portions of two different mesogenic compounds a new mesogenic complex is created which has enhanced mesophase stability.

BACKGROUND OF THE INVENTION

Liquid crystals are highly anisotropic fluids that exist between the boundaries of the solid and conventional, isotropic liquid phase. The phase is a result of long-range orientation ordering among constituent molecules that occurs within certain ranges of temperature in melts of many organic compounds. The ordering is sufficient to impart some solidlike properties on the fluid but the forces of attraction usually are not strong enough to prevent flow. Liquid crystallinity also is referred to as mesomorphism. Liquid crystals are in thermodynamic equilibrium over wide temperature ranges and undergo well-defined phase changes. Molecular interactions are known to contribute greatly to the organization of liquid crystalline states since the combination of molecular shape, size, and orientation of its interactions with neighboring species contribute to the liquid crystallinity of a molecule. The general, common molecular feature of such compounds is an elongated, narrow molecular framework, which usually is depicted as a rod or cigar-shaped entity.

The mixing of liquid crystal compounds to lower the solidifying point of liquid crystals and thereby extend the liquid crystal phase is known from numerous sources, including U.S. Pat. Nos. 4,090,975, 4,137,192, and 4,668,426. In each of these cases, the lowering of the melting point is merely an application of Raoult's law and the "stabilization" only results from a depression of the melting point; no intermolecular forces such as hydrogen-bonding are involved.

While it is known that intramolecular hydrogen bonding can induce mesomorphism, c.f. non-mesomorphic 4-amino-4''-nitro-p-terphenyl vs. mesomorphic 3-nitro-4-amino-4''-nitro-p-terphenyl, it is also known that hydrogen bonding may lead to nonlinear molecular associations that disrupt and prevent mesomorphism. Hydrogen-bonding associations also may be so strong that by the time the solid reaches its melting point, the thermal energy is too intense to permit substantial order to remain within the fluid and thus the solid passes directly into the isotropic liquid. (Kirk-Othmer Encyclopedia of Chemical Technology, Third Ed., Vol. 14, 413 (1982))

Several simple para-n-alkoxy substituted benzoic acids are known to form liquid crystalline phases due to dimer formation (G. W. Gray et al., *J.Chem.Soc.*, 4179 (1953)). Also mixtures of other similar dimers have been suggested (S. Takenaka et al., *Mol.Cryst.Lic.Cryst.*, 90, 365-371 (1983)) as also being liquid crystalline. Since the benzoic acids always exist as dimers in both the crystalline state and the mesophase, the dimer per se is art-recognized as a single component mesogen. In the present invention, it is the mixing of two independent and different liquid crystalline components capable of hydrogen bonding to one another that leads to the formation of the new mesogens having the enhanced mesophase stabilization properties as evidenced by an elevated mesophase (or liquid crystalline state) to isotropic transition temperature.

L. J. Yu et al., *Mol.Cryst.Lic.Cryst.*, 54, 1-8 (1979) discloses a mixture of a cyano-substituted biphenyl and a p-pentylbenzoic acid shows induced smectic mesomorphism. The authors have found that the dimeric benzoic acid behaves as an undissociated entity in its interaction with the biphenyl compound, and it is only the dimer that so interacts, but clearly not by hydrogen bonding. Also, there is no elevation of the nematic to isotropic transition temperature that occurs with the new hydrogenbonded mesogens of the present invention.

The abstract of Schroeder et al., *J.Org.Chem.*, 41, 2566 (1976) states "Within the well-ordered parallel molecular alignment of the mesophase, hydrogen bonding is no longer a detriment to mesomorphism and may, in fact, enhance it." While this might appear to impact upon the present invention, a careful reading of the reference clearly shows that the abstract is not indicative of the content of the article. The major finding is actually that some compounds which form hydrogen bonds can exhibit a mesophase, i.e. that hydrogen bonding does not prevent liquid crystallinity as some had thought. This is not the same as finding that hydrogen bonding is responsible for mesomorphism as in the present invention. It should be noted that Schroeder does not even consider mixtures of different compounds, let alone suggest an interaction therebetween.

In view of the stringent requirements of broad mesophase range, chemical stability, viscosity, dielectric and elastic constants, etc. for liquid crystal applications, there continues to be great interest in the synthesis of new liquid crystalline substances, i.e. mesogens, to meet the changing and increasing demands of this technology. The present invention arose from research directed to creating new mesogenic materials having an extended mesophase range and particularly mesophase to isotropic transition temperature which is above that of any of the individual components used to produce the new mesogenic materials.

Accordingly, it is an object of the present invention to develop new mesogenic materials which have increased mesophase to isotropic transition temperatures.

It is a further object to develop new mesogenic materials having increased mesophase stability as compared to any of the components utilized to produce them.

It is a further object to develop a method of producing additional mesogens which method will avoid having to conduct complicated reaction schemes.

These and still further objects will be apparent from the ensuing description of the invention.

SUMMARY OF THE INVENTION

It has now been found that novel mesogenic complexes can be formed by hydrogen bonding of a hydrogen donor mesogen to a different hydrogen acceptor mesogen along each of their long axes and that the new compounds exhibit enhanced mesophase stability. In particular the new mesogens exhibit a mesophase to isotropic transition temperature which exceeds the transition temperature of either of the individual mesogens which have been hydrogen bonded to form the new compounds.

DESCRIPTION OF THE PREFERRED EMBODIMENTS

Figure 1:
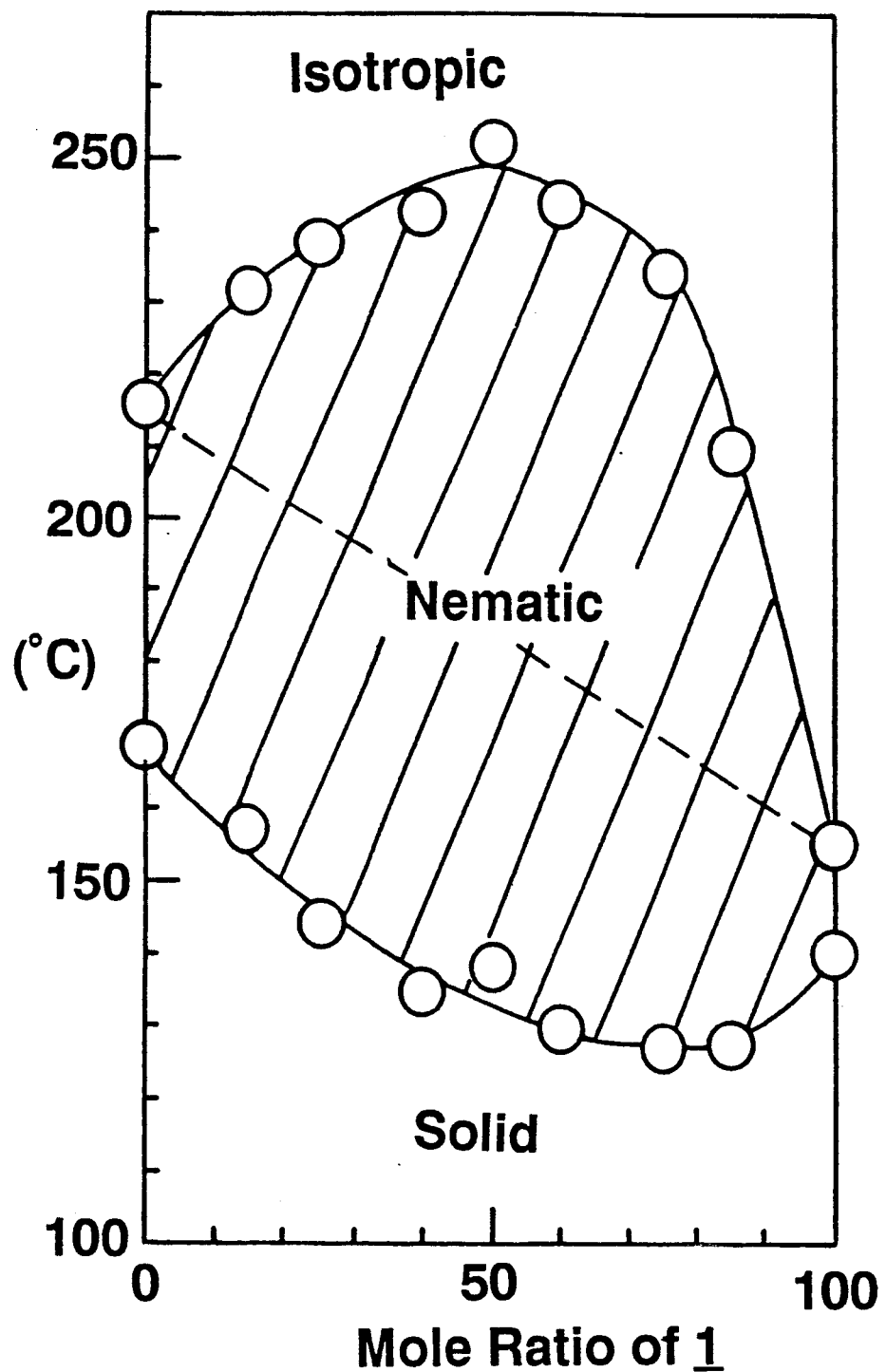
FIG. 1 illustrates a phase diagram for a hydrogen-bonded nematic mesogenic complex of the invention.

The novel mesogenic complexes of this invention are formed from the joining of two or more individual nematic or smectic mesogens along their long axes through a hydrogen bond. A hydrogen bond occurs when there is a hydrogen atom on or near a line joining two other atoms which are each normally selected from oxygen, nitrogen, fluorine, chlorine, and sulfur. It may be represented by the structure:

Q—H···Z wherein Q is selected from the group consisting of oxygen, nitrogen, and sulfur, H is hydrogen, and Z is selected from the group consisting of oxygen, nitrogen, sulfur, fluorine, and chlorine. Preferably the group Q—H is selected from —O—H and >N—H. Preferably Z is selected from O=, F—, O<, and N<—H. The molecule containing the group Q—H is referred to as the hydrogen donor mesogen and the molecule containing the Z as the hydrogen acceptor mesogen.

The present invention entails joining together a hydrogen donor mesogen containing the hydrogen donor group at substantially the end of its mesogenic portion and a different hydrogen acceptor mesogen containing a hydrogen acceptor at substantially the end one of its mesogenic portion. By starting with mesogens having the appropriate hydrogen bond-forming structures, a hydrogen bond may be formed between the two different mesogens which bond will be essentially along the long axes of each mesogen to produce a new mesogenic complex having an extended mesophase and an elevated nematic to isotropic transition temperature. The present invention has been found to be independent of the particular starting mesogens involved provided that they are capable of forming a hydrogen bond therebetween essentially along the long axes. A hydrogen bond is considered sufficiently along the long axes to be within the scope of the present invention if the resultant new mesogenic complex exhibits a mesophase to isotropic transition temperature which is higher than that of both of the starting mesogens Preferably the hydrogen bond is formed between terminal hydrogen donor and acceptor groups so as to produce the longest possible new mesogenic complex.

The strength of a hydrogen bond is related to the particular atoms to which both of the hydrogen bond-forming atoms is attached. Accordingly, preferred species for use as the hydrogen donor mesogen are those containing carboxylic acids, phenols, amides, and alcohols. Correspondingly, preferred species for the hydrogen acceptor mesogen include: pyridines, amines, and coumarines.

In the event that the hydrogen donor mesogen is a carboxylic acid, which normally exists in the form of its dimer, care must be taken to select a hydrogen acceptor mesogen which is sufficiently hydrogen rich that it will interact sufficiently to cause the carboxylic acid dimer to substantially dissociate so that maximum formation of the new mesogenic complex becomes possible. The extent of the dissociation will determine the amount of mesogenic complex which can be formed by hydrogen bonding. Thus the greater the dissociation, the more of the new complex that will be present. Accordingly, at least about 50% dissociation is desired, though preferably it will be at least 80%, and most preferably at least 90%. If dissociation is not complete, the new mesogenic complex will be produced and exist in combination with undissociated carboxylic acid dimer as well as unhydrogen bonded hydrogen bond acceptor mesogen. Of course, the extent of dissociation must be limited by the stochiometry of the mesogens. Thus if a mesogenic complex is prepared from a mixture of 5 moles of a carboxylic acid-containing mesogen and 1 mole of a pyridine-containing mesogen, only 1 mole of the acid mesogen can dissociate and it is this 1 mole to which the percent dissociation of above is intended to refer.

This invention is applicable to both nematic and smectic mesogens. As such, the non-hydrogen bonding portions of the mesogenic starting materials is not critical. Examples of suitable families of starting mesogens include, but are not limited to, Schiff bases, diazo compounds, azoxy compounds, stilbenes, tolans, esters, biphenyls, and terphenyls.

Specific examples of suitable mesogens useful as the hydrogen donor mesogenic compounds include:

(i) Schiff bases:

4-carboxybenzylidene-4'-cyanoaniline
4-dodecyloxy-1-napthylidene-4'-aminobenzoic acid
4-dodecyloxybenzylidene-4'-aminobenzoic acid
4-(4-n-dodecyloxybenzoyloxy)-benzylidene-4'-aminophenol
4-methoxybenzylidene-4'-aminobenzamide
4-aminobenzylidene-4'-dodecyloxyaniline (ii) Diazo compounds:
p-dodecyloxybenzene-azobenzoic acid 4-(4-hydroxybenzoyloxy)-4'-decyl-azobenzene
4-carboxy-4'-decyloxy-azobiphenyl (iii) Azoxy compounds:

4-ethoxy-4'-carboxy-azoxybenzene
4-carboxy-4'-(4-decyloxyphenoxycarbonyl)-azoxy-benzene
4-(3-propenoic acid)-4'-azoxybenzene (iv) Stilbenes:

4'-dodecyloxy-stilbene-4-carboxylic acid
4'-tetradecyloxy-stilbene-4-carboxamide
4-amino-4'-dodecyloxy-stilbene
4-hydroxy-4'-(4 dodecyloxybenzoyloxy)-stilbene (v) Tolans:

4-carboxy-4'-hexadecyloxy-tolane
4-carboxy-4'-(dodecyloxyphenyl)-tolane
4-oximo-4'-(4-tetradecyloxy)-tolane (vi) Esters:

4'-(4-hydroxyphenyl)4-(trans-4-pentylcyclohexyl-benzoate
4-(4-butylbenzoyloxy)-benzoic acid
4'-(4-aminophenyl)4-(trans-4-pentylcyclohexyl)-benzoate
4'-(4-amidophenyl)4-(trans-4-pentylcyclohexyl)-benzoate (vii) Biphenyls:

4'hexadecyloxybiphenyl-4-carboxylic acid
4-(4-methoxyphenyl)-cinnamic acid
4-oximo-4'-pentyl-biphenyl 4-hydroxy-4'-(p-hexadecyloxybenzoyloxy)-biphenyl
4'-(4-dodecyloxybenzoyloxy)-biphenyl-3-carboxylic acid
4'-(dodecyloxybenzoyloxy)-4-aminobiphenyl (viii) Carboxylic acids:

4-pentyl benzoic acid
trans-4-n-propyloxycinnamic acid
trans-4-n-nonyloxycinnamic acid
4'-n-butoxybenzoic acid
4'-n-dodecyloxydiphenyl-4-carboxylic acid (ix) Diols:

2-(trans-4-hexylcyclohexyl)-propan-1,3-diol
2-(trans-4-decylcyclohexyl)-propan-1,3-diol Examples of suitable H-bond acceptor mesogens useful herein include:
trans-4-(4-methoxybenzoyloxy)-4'-stilbazole
trans-4-(4-butoxybenzoyloxyl)-4'-stilbazole
4-nitrobenzylidene-4'-cyanoaniline
4-methoxybiphenylidene-4-fluoroaniline
4-nitro-4'-(4-dodecyloxybenzoyloxy)-stilbene
4-(4-dodecyloxybenzoyloxy)-4'-stilbazole
4-(4-dodecyloxybenzoyloxy)-4'N,N-dimethylaminostilbene
4-nitro-4(4-hexadecyloxybenzoyloxy)-tolane
4'(4-fluorophenyl)4-(trans-4-pentylcyclohexyl)-benzoate
4-fluoro-4'-(dodecyloxybenzoyloxy)-biphenyl
4-(4'''-hexadecyloxy-biphenyl-4'-oxamethylene)-pyridine
4-(4'''-hexadecyloxy-biphenyl-4'-oxamethylene)-pyridine-N-oxide
3-fluoro-4'-(hexdecyloxybenzoyloxy)-biphenyl
3-nitro-4'-(4-dodecyloxybenzoyloxy)-biphenyl
4-(4-dodecyloxyphenyl)-pyridine
4-(4-dodecyloxyphenyl)-pyridine-N-oxide
3-(4-hexadecyloxyphenyl)-pyridine As the hydrogen donor and hydrogen acceptor mesogens are known compounds or derivatives thereof, further details regarding their preparation and mesomorphism are not presented here, but rather may be found in the literature.

The mesogenic complexes of this invention may be generally prepared by simply dissolving preferably equimolar amounts of a hydrogen donor mesogen and a hydrogen acceptor mesogen in a suitable solvent and then slowly evaporating that solvent to encourage the formation of a hydrogen bond and thus the new mesogenic complex. Generally the solvent will be an "interacting" solvent (Vivas de Meftahi et al., Polymer, 29, 477 (1988)) which means that the solvent is able to compete in the formation of hydrogen bonds and break dimers if any are present. Selection of a suitable solvent may be readily determined merely by knowledge of its ability to form hydrogen bonds and its volatility or low latent heat of evaporation. Examples of suitable solvents include pyridine as well as other volatile amines such as cyclohexylamine, triethylamine, morpholine, and aniline, as well as acetic acid, phenol, dimethylformamide, fluorobenzene, and other fluorinated hydrocarbons. Preferably, the solvent is selected from pyridine, morpholine, acetic acid and dimethylformamide. Most preferably the solvent will be pyridine. In addition, the following procedure has been found beneficial in encouraging the formation of the desired hydrogen bond and is preferred: slow evaporation of the interacting solvent, followed by vacuum drying or precipitation from a common interacting solvent into a suitable non-solvent which is miscible with the interacting solvent.

Other methods of preparing the complex, e.g. mechanical mixing in the melt state, are possible.

While it is preferred that equimolar amounts of the hydrogen donor and hydrogen acceptor mesogens be used to form the complexes, if non-equimolar amounts are used then the product after solvent evaporation will contain a mixture of the new mesogenic complex along with whichever mesogenic compound was used in excess. Generally, the excess mesogen can be allowed to remain in the mixture and the entire mixture used in a suitable liquid crystal device. The mixture may show beneficial properties for certain applications.

The following examples of various embodiments of the present invention are presented by way of illustration and not of limitation. They are not intended to limit the scope of this invention as set forth in the appended claims.

EXAMPLE 1

In this example, a polyacrylate containing a 4-oxybenzoic acid unit and a spacer in the side chain is used as the hydrogen donor mesogen and a trans stilbazole unit with nitrogen at the 4-position is used as the hydrogen acceptor mesogen.

A. Synthesis of Hydrogen Donor Mesogen Polymer

The acrylate monomer, 4-(6-propenoyloxyhexyloxy) benzoic acid is synthesized according to the paper by Portugall et al., Makromol.Chem., 183, 2311 (1982). The monomer (1.0 g) is polymerized in dimethylformamide (0.3 w/o) with azoisobutyronitrile catalyst (1 m/o) at 60° vp 5C. for 9 hours under nitrogen atmosphere. The polymer is precipitated into methanol, resolved in dimethylformamide, and reprecipitated into the same solvent. The polymer is resolved in dry hot pyridine and filtered. After evaporation of the polymer solution, the polymer sample is dried and used as the component for the mesogenic complex. Yield 0.68 g (68%). Nematic 140° C.-155° C.

B. Synthesis of Stilbazole Ester

4-Hydroxystilbazole is synthesized according to the method of Chiang et al., *J.Org.Chem.*, 10, 21 (1944). 4-Hydroxystilbazole (0.76 g, 3.9 mmol) and p-anysoyl chloride (0.72 g/4.2 mmol) in 20 ml of pyridine are stirred for 30 hours at 80° C. The reaction mixture is poured into water and filtered. The white solid is washed with NaHCO$_3$ (aq), then with water. The precipitate is isolated and recrystallized from acetone-water mixture. It is identified by NMR and FT-IR as trans-4-(4-methoxybenzoyloxy) -4'-stilbazole. Yield 0.82 g (62%). Nematic 168° C.-216° C.

C. Preparation of Mesogenic Complex

Equimolar amounts of the two components (2-10 mg) are dissolved in 10 ml of dry pyridine by warming. Then, the solvent is slowly evaporated under reduced pressure by warming at a temperature of about 30° C.-40° C. The solid products obtained from dried under vacuum.

D. Evaluation of Mesomorphism

Phase transition temperatures were determined by use of a polarizing microscope equipped with a hot state (Mettler FP-52) and by differential scanning calorimetry (Mettler DSC 20 and DSC 30). Nematic-isotropic (N-I) transition temperature of the mesogenic complex was determined by visual observation at a heating rate of 10° C./min. The middle point of the range of the N-I transition where mesophase and isotropic state coexist was taken as the N-I transition temperature. Nematic 140° C.-252° C.

E. preparation of Non-Equimolar Complexes

The procedure of C is repeated to produce a series of mesogenic complexes of the same mesogens but at different molar ratios. The complexes produced range from 15 to 85 mole % hydrogen donor polymer and correspondingly 85 to 15 mole % hydrogen acceptor stilbazole. The resultant complexes are evaluated as is, i.e. without removal of the excess mesogen starting material which is not complexed. Nematic to isotropic from 232° C.-244° C.

F. Characterization of the Results

The results shown in FIG. 1 for the 1:1 complex indicate a mesophase extending from 140° C. to 252° C. Since the individual components exhibit a transition to isotropic phase at 155° C. and 216° C. respectively, it is clear that a material different from each has formed. The range of the mesophase for the complex is 112° C. while the corresponding ranges for the individual components are 15° C. and 48° C. respectively. FIG. 1 also shows that all of the complex compositions having less than 85 mole % of hydrogen donor polymer exhibited transition to isotropic temperatures in excess of both of the starting mesogens. If a new complex had not formed and there were no strong interaction between the hydrogen donor mesogen and the hydrogen acceptor mesogen, then the nematic-to-isotropic transition would be expected to lie close to the dashed straight line in FIG. 1.

Figure 2:
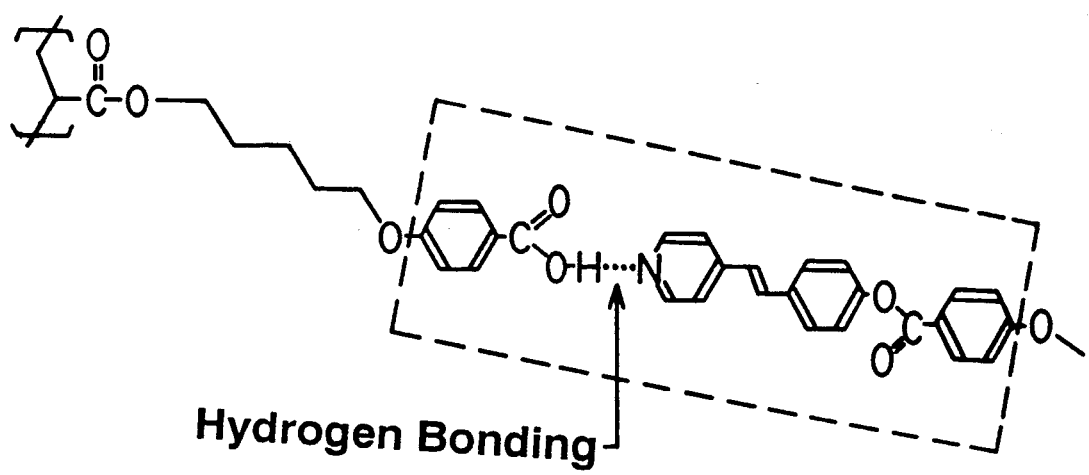
FIG. 2 illustrates the structure of a portion of the hydrogen-bonded mesogenic complex of FIG. 1.

To confirm the existence of the hydrogen-bonded complex, FT-IR measurements are obtained. They indicate that the band at 1685 cm$^{-1}$ observed for the acrylate polymer hydrogen donor mesogen due to dimerization of the carboxylic acid greatly diminishes and a new band at 1740 cm$^{-1}$ attributable to the complexation between the pyridine and the carboxylic acid is observed. The structure of a portion of the hydrogen bonded complex is shown in FIG. 2 wherein the dots represent the hydrogen bond and the dashed box represents the mesogen.

EXAMPLE II

The procedures of Example I are repeated with a different non-polymeric proton donor mesogen, 4-butoxybenzoic acid (nematic 147° C.-160° C.), and a different proton acceptor mesogen, trans-4-(4-ethoxybenzoyloxy)-4'-stilbazole (nematic 165° C.-213° C.). Equimolar amounts of each mesogen are dissolved in warm pyridine and the pyridine is slowly evaporated to form the hydrogen bonded mesogenic complex.

Figure 3:
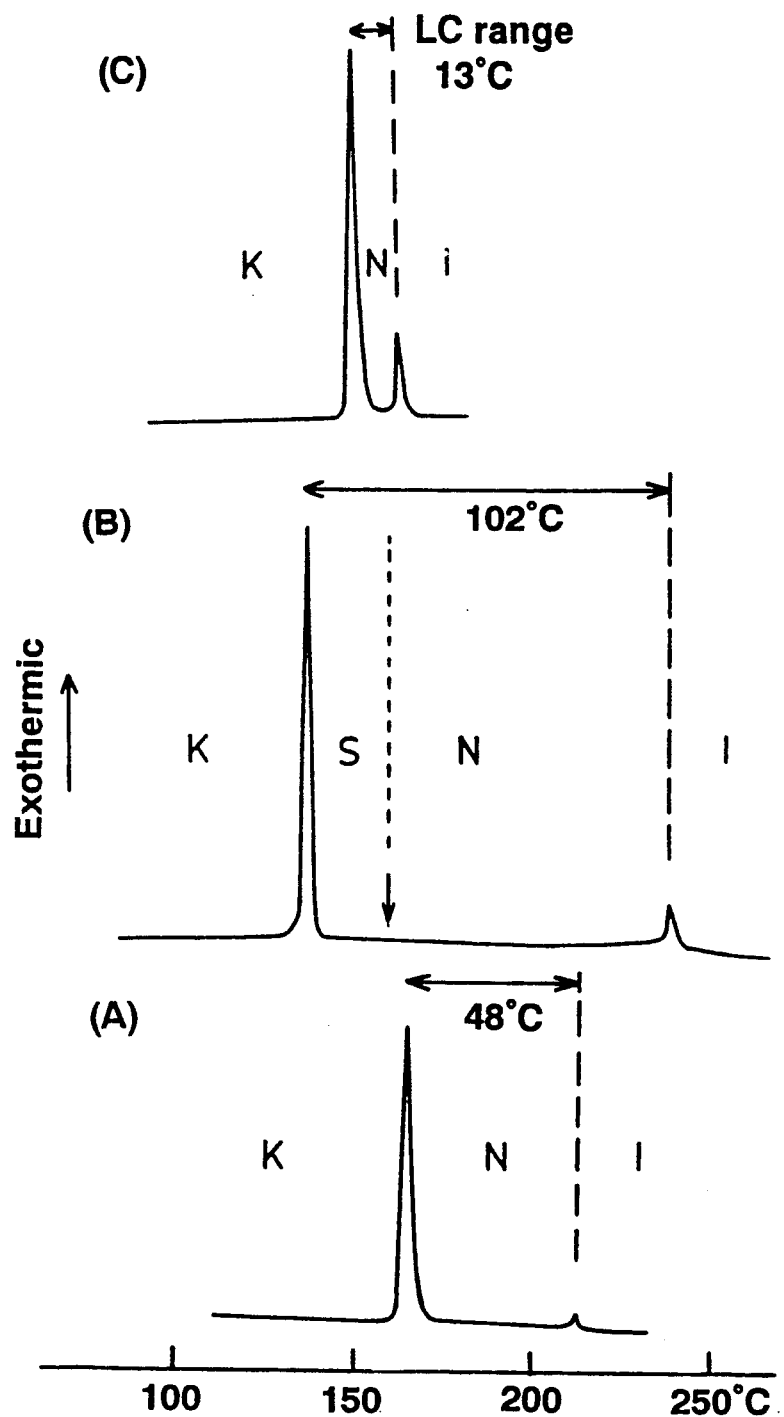
FIG. 3 illustrates the differential scanning calorimetry results for (A) 4-hydroxystilbazole, (B) a 1:1 complex of 4-hydroxystilbazole and 4-butoxybenzoic acid, and (C) 4-butoxybenzoic acid.

The liquid crystallinity of the newly formed complex is examined by differential scanning calorimetry (Mettler DSC 30) and a polarizing microscope with a hot stage (Mettler FP 82). FIG. 3 shows the DSC thermograms of each of the starting mesogens as well as that of the new 1:1 complex. The complex exhibits a very stable mesophase. The endothermic peaks at 136° C.and 238° C. correspond to melting and isotropization transitions of the 1:1 complex. The isotropization temperature of the complex (238° C.) is substantially elevated over those of the starting mesogens. Also the mesomorphic range of the complex is 102 C. as compared to 13° C. and 48° C. repsectively for the hydrogen donor and hydrogen acceptor mesogens.

Moreover, visual observation by hot-stage polarizing microscopy of the complex clearly shows a smectic A phase which does not appear for either single mesogen. The smectic A phase occurs between 136 and 160 C. It is indicated in FIG. 3 for convenience even though it is not apparent in the DSC thermogram.

Figure 4:
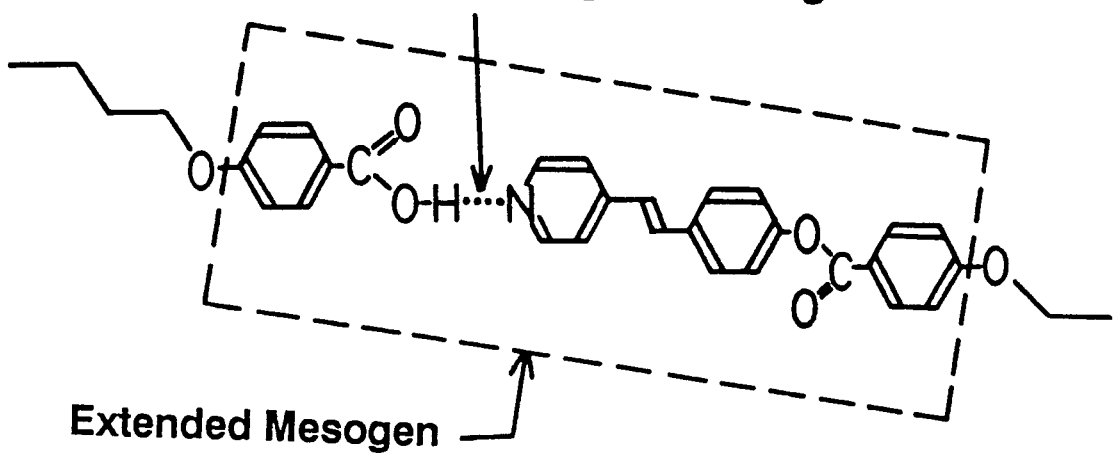
FIG. 4 illustrates the structure of the new mesogenic complex of FIG. 3B.

In view of the thermogram, the 1:1 molar complex is behaving as one single liquid crystalline component, clearly indicative of intermolecular hydrogen bonding. FT-IR measurements confirm this. They indicate that the band at 1681 cm$^{-1}$ observed for the 4-butoxycarboxylic acid hydrogen donor mesogen due to dimerization thereof disappears and a new band at 1740 cm$^{-1}$ attributable to the complexation between the pyridine ring and the carboxylic acid is observed. The structure of a portion of the hydrogen bonded complex is shown in FIG. 4 wherein the dots represent the hydrogen bond and the dashed box represents the new extended mesogen.

EXAMPLE III

The procedures of Example I are repeated to produce additional hydrogen bonded mesogenic complexes from the mesogen pairs listed in Table A below:

TABLE A

Hydrogen Donor Mesogen

A. trans-(4-dodecyloxy)cyclohexane carboxylic acid
B. 2-(trans-4-n-decylcyclohexyl)-propan-1,3-diol
C. 4-oximo-4'-(tetrodecyloxy)-tolane Hydrogen Acceptor Mesogen A. (4-octyloxy)phenyl-4-(4'-pyridyl)-benzoate
B. (4-dodecyloxy)phenyl-4-(4'-N-oxopyridyl)-benzoate
C. 4-methoxybiphenylidene-4-fluoroaniline In each case an equimolar mesogenic complex is produced by hydrogen bonding between the hydrogen donor compound and the hydrogen acceptor compound along their respective long axes. Each complex exhibits an increased isotropization temperature as compared to the starting compounds.

COMPARATIVE EXAMPLE

The procedure of Example I is repeated with hydrogen donor and hydrogen acceptor mesogens wherein the donor and acceptor groups can not form a hydrogen bond which is directed along the long mesogenic axes of both molecules. Specifically, p-phenylene-1 -(4-hydroxybenzoate)-4-(4-hexyloxybenzoate) is the donor mesogen and trans-4-(methoxybenzoyloxy)-4'-stilbazole is the acceptor mesogen. The resulting 1:1 complex exhibits N-I behavior similar to that of a mere mixture with no increase in isotropization temperature as was observed in Examples -I and II.

As numerous alternatives within the scope of the present invention will occur to those skilled in the art, besides those embodiments, equivalents, alternatives and variations mentioned supra, it is to be understood that the invention is to be limited only by the scope of the appended claims, and functional and structural equivalents thereof.

What is claimed is:

1. A method of using a mesogen having along axis and a terminal portion which contains a hydrogen bondable group at the end thereof to prepare solid mesogenic complexes consisting of hydrogen bonding said mesogen to a second mesogen having a long axis and a terminal portion which contains a hydrogen bondable group at the end thereof, wherein (i) the hydrogen bond is formed sufficiently along the long axes of the two mesogens that the resultant complex exhibits an isotropization temperature which is in excess of the isotropization temperatures of both said mesogen and said second mesogen, (ii) the two mesogens are different chemical species which contain different functional groups which act as H-bond donor and H-bond acceptor, and (iii) the hydrogen bond is formed between said different functional groups.

2. The method of claim 1, wherein the H-bond donor mesogen contains a hydrogen-bond forming group of the formula -(Q—H) at the end of its mesogenic portion; Q is selected from the group consisting of oxygen, nitrogen, and sulfur; and H is hydrogen.

3. The method of claim 2, wherein -(Q—H) is selected from the group consisting of —O—H and >N—H.

4. The method of claim 1, wherein the H-bond acceptor mesogen contains a hydrogen bond forming atom -Z located at an end of the mesogen and chemically bonded thereto, wherein Z is selected from the group consisting of oxygen, nitrogen, sulfur, fluorine, and chlorine.

5. The method of claim 1, wherein (i) the H-bond donor mesogen contains a group of the formula -(Q—H), wherein Q is selected from the group consisting of oxygen, nitrogen, and sulfur, and H is hydrogen, and (ii) the H-bond acceptor mesogen contains a hydrogen bondable atom -Z chemically bonded thereto and selected from the group consisting of oxygen, nitrogen, sulfur, fluorine, and chlorine.

* * * * *